(12) United States Patent
Dawson

(10) Patent No.: US 6,750,869 B1
(45) Date of Patent: Jun. 15, 2004

(54) METHOD AND DESIGN FOR IMPROVED FRAGMENT PROCESSING

(75) Inventor: Thomas Patrick Dawson, Escondido, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 412 days.

(21) Appl. No.: 09/687,998

(22) Filed: Oct. 13, 2000

(51) Int. Cl.[7] .............................................. G09G 5/39
(52) U.S. Cl. ...................... 345/531; 345/611; 345/613; 345/614
(58) Field of Search ................................ 345/531, 611, 345/614, 540, 613, 581

(56) References Cited

U.S. PATENT DOCUMENTS

| | | | |
|---|---|---|---|
| 5,237,650 A | 8/1993 | Priem et al. ................. | 395/143 |
| 5,596,684 A | 1/1997 | Ogletree et al. ............ | 395/109 |
| 5,929,862 A | 7/1999 | Barkans ...................... | 345/431 |
| 5,977,977 A | 11/1999 | Kajiya et al. ............... | 345/418 |
| 5,990,904 A | 11/1999 | Griffin ........................ | 345/435 |
| 5,999,189 A | 12/1999 | Kajiya et al. ............... | 345/430 |
| 6,020,901 A | * 2/2000 | Lavelle et al. | |
| 6,204,859 B1 | * 3/2001 | Jouppi et al. | |
| 6,433,788 B1 | * 8/2002 | Morein | |

OTHER PUBLICATIONS

"Z3: an economical hardware technique for high–quality antialiasing and transparency"; Norman P. Jouppi, Chun–Fa Chang Proceedings of the 1999 Eurographics/SIGGRAPH workshop on Graphics hardware Jul. 1999.*

"A New Simple and Efficient Antialiasing with Subpixel Masks"; Andreas Schilling, Universitat Tubingen, Bundesrepublik Deutschland; Computer Graphics; vol. 25; No. 4; Jul. 1991.

"Hardware Accelerated Rendering of Antialiasing Using A Modified A–Buffer Algorithm"; Stephanie Winner, Mike Kelley, Brent Pease, Bill Rivard and Alex Yen; Apple Computer, CA.

* cited by examiner

Primary Examiner—Kee M. Tung
Assistant Examiner—Hau Nguyen
(74) Attorney, Agent, or Firm—Wagner, Murabito & Hao LLP

(57) ABSTRACT

A method and system thereof for processing data in a computer graphics system. More specifically, an antialiasing buffer architecture for processing fragments in a computer graphics system is described. When a new fragment for a particular pixel location is received, the fragment stack for that pixel location is read from fragment memory. The new fragment is appended to the fragment stack, and the resultant fragment stack is written back to fragment memory before it is processed in a computer graphics pipeline. Fragments stored in fragment memory are not sorted according to their distance from the view plane (the z-dimension); instead, z-ordered depth sorting is performed in the computer graphics pipeline. Using an occlude command, occluded (blocked) fragments can be deleted from the fragment stack before the fragment stack is passed to the computer graphics pipeline. The computer graphics pipeline calculates a pixel color for each pixel location. Multiple computer graphics pipelines can be executed in parallel, and the pixel colors determined in each pipeline are interleaved and stored in a frame buffer. Because fragment stacks are read from and written back to fragment memory before processing in the computer graphics pipeline, processing is not held up waiting for the reads and writes to occur and data throughput in the pipeline is increased. Consequently, the overall performance of the computer graphics system is improved.

27 Claims, 8 Drawing Sheets

METHOD AND DESIGN FOR IMPROVED FRAGMENT PROCESSING

BACKGROUND OF THE INVENTION

1. Field of the Invention

The present invention relates to the field of data processing in a computer graphics system. More specifically, the present invention pertains to an anti-aliasing buffer architecture for processing fragments in a computer graphics system.

2. Background Art

Computer graphics generally consists of instructions implemented via a graphics system executed on a computer system. The instructions are used to specify the calculations and operations needed to produce rendered images that have a three-dimensional appearance.

The computer graphics system can be envisioned, in part, as a pipeline through which pixel data pass. The data are used to define the image to be produced and displayed. At various points along the pipeline, various calculations and operations are specified by the graphics designer, and the data are modified accordingly.

In the initial stages of the pipeline, the desired image is composed using geometric shapes such as lines and polygons, referred to in the art as geometric "primitives." The derivation of the vertices for an image and the manipulation of the vertices to provide animation entail performing numerous geometric calculations in order to project the three-dimensional world being designed to a position in the two-dimensional world (the "view plane") of the display screen.

Primitives are then decomposed into "fragments," and these fragments are assigned attributes such as color, perspective, and texture. In order to enhance the quality of the image, effects such as lighting, fog, and shading are added, and anti-aliasing and blending functions are used to give the image a smoother and more realistic appearance. In the final image generation stage, the fragments and their associated attributes are stored in the frame buffer as pixels. The pixel values can be later read from the frame buffer, and can be used to display images on the computer screen.

The entire process, from projecting the primitives onto the view plane through formation of the output image, is known as rendering. The specific process of decomposing individual primitives and determining per-pixel or per-fragment values from those geometric primitives is known as rasterization.

With reference now to Prior Art FIG. 1, process 130 exemplifies one embodiment of a graphics design process implemented using a graphics program on a computer system. Process 130 operates on vertex (or geometric) data 131. The blocks within process 130 consist of display list 133, evaluators 134, per-vertex operations and primitive assembly 135, rasterization 138, per-fragment operations 139, and frame buffer 140.

Vertex data 131 are loaded from the computer system's memory and saved in display list 133; however, in some graphics programs, a display list is not used and, instead, the vertex data are processed immediately. When display list 133 is executed, evaluators 134 derive the coordinates, or vertices, that are used to describe points, lines, polygons, and the like (e.g., primitives). All geometric primitives are eventually described by collections of vertices.

With reference still to Prior Art FIG. 1, in per-vertex operations and primitive assembly 135, vertex data 131 are converted into primitives that are assembled to represent the surfaces to be graphically displayed. Some vertex data (for example, spatial coordinates) are transformed, typically using matrix multiplication, to project the spatial coordinates from a position in the three-dimensional world to a position on the display screen.

In addition, advanced features are also performed in per-vertex operations and primitive assembly 135. Texturing coordinates may be generated and transformed. Lighting calculations are performed using the transformed vertex, the surface normal, material properties, and other lighting information to produce a color value. Perspective division, which is used to make distant objects appear smaller than closer objects in the display, also occurs in per-vertex operations and primitive assembly 135.

Rasterization 138 is the conversion of vertex data into "fragments." Each fragment corresponds to a single element (e.g., a "pixel") in the graphics display, and typically includes data defining color, shading, and texture. Per-fragment operations 139 consist of additional operations that may be enabled to enhance the detail of the fragments, such as blending, dithering and other like operations. After completion of these operations, the processing of the fragment is complete and it is written as a pixel to frame buffer 140.

Part of the process of anti-aliasing is performed during rasterization 138. Anti-aliasing is a technique for correcting the problem of aliasing, which can cause the edges of an object to appear jagged when the object is rendered. For example, a polygon may only partially cover a number of pixels; that is, the edge of the polygon may pass through a number of adjacent pixels. If these pixels are approximated as being fully covered by the polygon (and are colored the color of the polygon), the edge the polygon would likely appear as jagged when it is rendered. In addition, the fragments that correspond to each screen pixel must be kept in a sorted order according to their distance from the view plane.

In general, there are two common approaches for implementing this sorted ordering: the "Z-buffer" approach and the "A-buffer" approach. In the Z-buffer approach, pixel data including a depth value (e.g., a z-dimension indicating distance from a view plane) are stored for every pixel location in a display image. As geometric primitives are rasterized, the depth values for newly generated pixel data are compared to depth values for pixel data in the Z-buffer. If the newly generated pixel data are closer to the view plane (e.g., a smaller value of z), then these data are written over the current pixel data in the Z-buffer. If the newly generated pixel data have a larger value of z, then the new data are disregarded.

The Z-buffer approach will always result in aliasing because it does not adequately address partially covered pixels. The A-buffer approach improves the Z-buffer approach by addressing anti-aliasing for partially covered pixels.

In the A-buffer approach, polygons are clipped into fragments at the boundaries of a pixel. For example, consider a square-shaped pixel partially covered by a portion of a polygon. A pixel fragment would be generated to represent the portion of the polygon covering the pixel. A bit mask representing the edges of the polygon is used to describe how the polygon partially covers the pixel. When there are multiple polygons contributing to the color of a pixel, multiple pixel fragments are generated, and the colors of the fragments are then resolved within the A-buffer to compute a final color for the pixel. The multiple fragments corresponding to a pixel location are stored in memory as a "fragment stack."

Prior Art FIG. 2 is a data flow diagram showing one embodiment of an anti-aliasing buffer (A-buffer) architecture 200 used in a computer graphics system. In A-buffer architecture 200, the fragment data flow in a loop from fragment memory 210 to fragment manager 220, through fragment evaluation pipeline 230a or 230b, then back to fragment memory 210. The process may also be performed using parallel paths, each path with distinct fragment memory, fragment manager, evaluation pipeline(s), and result router.

A new fragment 202 for a particular pixel location causes fragment stack 212 for that pixel location to be read from fragment memory 210. Fragment manager 220 feeds fragment stack 212 to one of the fragment evaluation pipelines 230a or 230b (it is appreciated that more than two pipelines can be used in A-buffer architecture 200).

After evaluation in the pipeline, the final pixel color for the pixel location is determined, and pixel data 246 (comprising the pixel color and pixel location) are sent to frame buffer 140 via evaluation result router 240. Also, evaluation result router 240 writes the processed fragment stack 235 back to fragment memory 210, so that fragment stack 235 can be accessed the next time a new fragment is received for the pixel location. Thus, in the prior art, the data that are output from pipelines 230a and 230b are written to fragment memory 210. Smaller memory caches are sometimes used in conjunction with fragment memory 210 to speed up access to repetitively used fragment stacks.

In most implementations, fragment memory 210 uses a paging scheme to read and write fragment stacks (e.g., fragment stacks 212 and 235, respectively). These implementations take into account that the average polygon size is fifty pixels or less. As such, the average width of the polygon is eight pixels or less. Because of the amount of data stored for each fragment, and the need to keep memory pages small for quick access to prevent visual artifacts, most polygons will cross at least one memory page boundary. That is, the page position is fixed but the polygon position is not (in an animated image), and therefore it is probable that polygons will cross the page boundary.

Prior Art FIG. 3 illustrates a polygon 310 spanning multiple memory pages 320, 322, 324 and 326 in a fragment memory 210 used with a computer graphics system. Fragment memory 210 is aligned with the display screen coordinates. Accordingly, a fragment stack (exemplified by fragment stack 315) is associated with a particular pixel location on the display screen.

Each fragment in fragment stack 315 typically is associated with the following information that must be stored in fragment memory 210: a transparency flag (one bit); a transparency value (eight bits); a stencil flag (one bit); a stencil value (eight bits); a fragment color (red, green or blue, typically at least eight bits each; some systems use ten bits each); a fragment mask (typically, at least 16 bits); a fragment z-dimension (typically, 24 bits); various stack control flags (typically, 6 bits); an offset to the next fragment in the stack (at least eight bits); the total number of bits required for each fragment in a stack (at least 96 bits, or 12 bytes); and in some implementations, a header word that holds the pixel location, current final color, touched flag, and an offset to the first entry in the stack.

With reference back to Prior Art FIG. 2, A-buffer architecture 200 has several disadvantages. One disadvantage to the prior art is associated with the paging scheme used by fragment memory 210. Swapping memory pages is time-consuming in the context of a processing pipeline (e.g., fragment evaluation pipeline 230a) that is trying to keep up with a high performance graphics system that may be producing tens of millions fragments (or more) per second. The size of the memory page must be tuned to the graphics system in order to optimize performance. If the page size is made too small, then memory pages must be swapped more often. On the other hand, if the page size is made too large, then it takes more time to swap them, and this may cause visible artifacts in the display.

Also associated with this disadvantage is the depth (number of stages) in fragment evaluation pipelines 230a and 230b. To gain the necessary data throughput, fragment evaluation pipelines 230a and 230b must include multiple stages. Generally, there are at least eight stages to a pipeline: pixel ownership test, scissors test, alpha test, stencil test, depth test, blend, dither, and logic operations. Each stage of fragment evaluation pipelines 230a and 230b will be operating on a different fragment stack. Typically, a fragment stack moves from one stage in the pipeline to the next stage in the pipeline every "N" clock cycles. Each stage in the pipeline has a set number, N, of clock cycles to complete its function. The slowest stage in the pipeline (the stage with the maximum N) controls the speed of the pipeline.

With reference to Prior Art FIGS. 2 and 3, it is common for a fragment stack to be in the process of being read from one page in fragment memory 210 while another fragment stack waits to be written to a different page in fragment memory 210. That is, fragment stack 212 may be in the process of being read from memory page 322; in the meantime, fragment stack 235 has been processed in fragment evaluation pipeline 230a and needs to be written to a different memory page 320. This causes "memory (or page) thrashing" or "page misses," in which one memory page is open in order to read data and another memory page needs to be opened in order to write data (and vice versa). As a result of memory thrashing, processing is delayed until the necessary read or write can be accomplished. The processing delay may be manifested as lag or a loss in detail in the rendered image.

Consequently, another problem with the prior art A-buffer architecture 200 occurs when the data that are output from pipelines 230a and 230b are written to fragment memory 210. A different memory page may be open, and thus the post-pipeline write operation is delayed until the proper memory page can be opened and the processed data (e.g., fragment stack 235) written to fragment memory 210. This delay (due to memory thrashing) will be propagated back through pipelines 230a and 230b, thereby reducing the processing efficiency and data throughput of the computer graphics system.

Similarly, if data (e.g., fragment stack 212) are to be read from one page in fragment memory 210, but a different page is open because the post-pipeline write operation is ongoing, then the read will be delayed until the proper memory page can be opened. As a result, pipelines 230a and 230b may be starved for data, with processing delayed until data are received.

In addition, fragment evaluation pipelines are being increased in length in order to add stages that provide effects, such as shadows, that increase the realism of the rendered images. Longer pipelines can exacerbate the problem of memory thrashing by increasing the likelihood that one memory page will be open when another is needed. As described above, increasing the size of the memory page to alleviate this problem will result in processing delays because of the additional time needed to read (or write) the larger pages. Adding a cache between the end of fragment evaluation pipeline 230a and fragment memory 210, or between fragment memory 210 and the beginning of fragment evaluation pipeline 230a, also does not help, because the cache will fill up and thus may contribute to the memory thrashing problem (in effect, the cache simply adds another stage to the pipeline).

The use of multiple fragment evaluation pipelines can also aggravate the memory thrashing problem. One pipeline may be attempting to read a memory page, and another may be attempting to write to a different page. With multiple pipelines attempting to access fragment memory 210 at different times, the frequency of memory thrashing will get worse.

Yet another disadvantage associated with A-buffer architecture 200 is that the entire fragment stack (e.g., fragment stack 212) is carried all the way through fragment evaluation pipeline 230a. In some instances, the entire fragment stack 212 is not required. As described above, a significant amount of information is associated with each fragment in a fragment stack. As a result, the data throughput in A-buffer architecture 200, in particular in fragment evaluation pipeline 230a, is reduced because of the additional time needed to read/write as well as process the data.

With reference still to Prior Art FIG. 2, another problem associated with A-buffer architecture 200 is that status memory 205 is a part of fragment memory 210. Status memory 205 is assigned to hold a set of three status bits for each fragment stack. The status bits include an "exist" bit that is used to indicate whether the fragment stack currently holds any fragments, a "valid/invalid" bit to indicate whether the fragment stack at this location is valid or has been invalidated (used to erase areas of A-buffer memory), and a "size" bit to indicate whether the fragment stack has reached the defined maximum number of fragments per stack. For a typical 1280 by 1024 pixel screen, the three status bits can require almost one-half megabyte of memory.

Because status memory 205 is within fragment memory 210, it needs to be accessed with the same memory paging mechanism. This means that A-buffer architecture 200 requires a caching scheme to hold the status memory page while the fragment memory page is being worked on (e.g., read). However, the amount of space available on an integrated circuit is limited, and therefore the space that can be used for the caching scheme is also limited. In addition, as fragment evaluation pipelines grow in length and complexity, there may be more effective uses of the space assigned to the caching scheme.

An additional disadvantage associated with the prior art is that fragments in a fragment stack are depth-sorted (by z-dimension) in fragment memory 210. Prior art systems such as A-buffer architecture 200 rely on storing the fragment stack in sorted order to more easily identify where to insert a new fragment 202 into a fragment stack 212. Depth-sorting always increases the number of operations that need to be performed on the fragment stack 212. That is, this technique makes it unnecessary to perform operations to determine that the fragment stack 212 is in sorted order, and to perform operations to sort the fragment stack. However, the mechanism to complete re-sort the fragment stack must still be available.

Typically, fragment stack 212 is depth-sorted in fragment evaluation pipeline 230a. There are, however, several factors that require fragment stack 212 to be re-sorted prior to the depth test. These factors can include such things as the results of the stencil test, or a change in depth sorting order. Because fragment stack 212 is depth-sorted in fragment evaluation pipeline 230a, it is desirable to reduce the number of operations associated with determining whether fragment stack 212 is already in sorted order.

SUMMARY OF THE INVENTION

Accordingly, what is needed is a method and/or system that can be used in a computer graphics system to address the memory thrashing problem that occurs when reading and writing fragment stacks from fragment memory. What is also needed is a method and/or system that address the above need and that can increase the speed at which fragment stacks are read from and written to fragment memory. In addition, what is needed is a method and/or system that address the above needs and that can increase the data throughput in a computer graphics system. Furthermore, what is needed is a method and/or system that address the above needs and that can reduce the number of operations associated with depth-sorting the fragments in a fragment stack. What is also needed is a method and/or system that address the above needs and that can allow status memory to operate independently of fragment memory.

The present invention includes a method and system thereof that satisfy the above needs. These and other advantages of the present invention not specifically mentioned above will become clear within discussions of the present invention presented herein.

In one embodiment, a method and system thereof for processing data in a computer graphics system are described. In the present embodiment, when a new fragment for a particular pixel location is received, the fragment stack for that pixel location is read from fragment memory. The new fragment is appended to the fragment stack, and the resultant fragment stack is written back to fragment memory before it is processed in a computer graphics pipeline. Thus, in accordance with the present invention, the write back to fragment memory after processing in the computer graphics pipeline is eliminated.

In accordance with the present invention, fragments stored in fragment memory are not sorted according to their distance from the view plane (the z-dimension); instead, z-ordered depth sorting is performed in the computer graphics pipeline. Using an occlude command, occluded (blocked) fragments can be deleted from the fragment stack before the fragment stack is passed to the computer graphics pipeline. The computer graphics pipeline calculates a pixel color for each pixel location. Multiple computer graphics pipelines can be executed in parallel, and the pixel colors determined in each pipeline can be interleaved to improve processing efficiency.

In one embodiment, an anti-aliasing buffer architecture for processing fragments in a computer graphics system is described. The anti-aliasing buffer architecture comprises a fragment memory, one or more fragment evaluation pipelines, and a frame buffer. In one embodiment, the anti-aliasing buffer architecture further comprises a fragment memory manager and a fragment evaluation pipeline manager. In this embodiment, the fragment evaluation pipeline manager receives a new fragment for a particular pixel location and writes the new fragment to the fragment memory manager. The fragment memory manager reads the fragment stack for that pixel location and appends the new fragment to the fragment stack. In accordance with the present invention, the fragment stack (including the new fragment) is written back to fragment memory before further processing in a fragment evaluation pipeline. Thus, the fragment stack can be written to its memory page in fragment memory while that page is still open (that is, before a page swap occurs), and therefore page thrashing can be prevented.

In the present embodiment, the fragment memory manager also sends the fragment stack (including the new fragment) to the fragment evaluation pipeline manager, and in turn the fragment stack is processed in a fragment evaluation pipeline to determine a pixel color for the pixel location being evaluated. The pixel color is then stored in the frame buffer; when multiple fragment evaluation pipelines are being used, the pixel colors determined in each pipeline are interleaved to improve efficiency. Significantly, in accordance with the present invention, fragment stacks are not written to fragment memory after processing in the fragment evaluation pipeline(s).

In the present embodiment, each fragment evaluation pipeline performs z-ordered depth sorting of the fragment stack as a pipeline stage (where the z-dimension indicates distance to a view plane). Thus, in accordance with the present invention, fragments can be stored in fragment memory in arbitrary z-dimension order within a fragment stack (that is, fragments in a fragment stack do not need to be sorted according to the z-dimension before the fragment stack is stored in fragment memory). Therefore, the operations associated with depth-sorting the fragments in a fragment stack is relegated to one or more pipeline stages and do not affect overall throughput.

In the present embodiment, when a fragment evaluation pipeline determines that a fragment is blocked from view (and thus will not contribute to the pixel color at a pixel location), an occlude command is sent to the fragment memory manager. The fragment memory manager sets an occlude status bit for that pixel location. In one embodiment, when the fragment stack for the pixel location is next read from fragment memory, the fragment memory manager deletes the occluded fragments from the fragment stack. Thus, when the occlude status bit is set, the fragment stack is "trimmed;" therefore, only visible fragments are forwarded to the fragment evaluation pipeline(s). Deleting occluded fragments from a fragment stack can increase throughput through an anti-aliasing buffer architecture. Making a fragment stack shorter means that it can be more quickly read from and written to fragment memory.

In one embodiment, the anti-aliasing buffer architecture further comprises a status memory for storing an additional bit—the occlude status bit—for each of the pixel locations. In this embodiment, the status memory is placed on a separate memory bus or in a memory bank separate from fragment stack memory. This allows the status memory (specifically, a status memory page) to operate independently of a fragment memory page without affecting access to fragment data.

In summary, in accordance with the present invention, fragment stacks are read from and written back to fragment memory before processing in the computer graphics pipeline(s). It is not necessary for the entire fragment stack to be passed all the way through a fragment evaluation pipeline before it is written back to fragment memory. Fragment stacks being processed in the fragment evaluation pipeline(s) are not held up waiting for a memory page swap to write back to fragment memory, and vice versa. Also, pixel writes to the frame buffer are not held up because of page misses in fragment memory. As a result, processing performance in the fragment evaluation pipeline(s) can be improved and data throughput in the pipeline(s) can be increased, improving the overall performance of a computer graphics system.

DESCRIPTION OF THE DRAWINGS

The accompanying drawings, which are incorporated in and form a part of this specification, illustrate embodiments of the invention and, together with the description, serve to explain the principles of the invention.

Prior Art

Prior Art

Prior Art

DETAILED DESCRIPTION OF THE INVENTION

In the following detailed description of the present invention, a method and design for improved fragment processing, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within an intelligent electronic media device. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a consumer electronic media device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "receiving," "reading," "appending," "writing," "deleting," "sending," "processing," "storing," "interleaving," "identifying," "setting," "performing" or the like, refer to the action and processes (e.g., process 700 of FIG. 7) of an electronic device such as a microcontroller or similar electronic computing device (e.g., dedicated or embedded computer system) that manipulates and transforms data. The data are represented as physical (electronic) quantities within the electronic device's registers and memories and is transformed into other data similarly represented as physical quantities within the electronic device memories or registers or other such information storage, transmission, or display screens.

Figure 1:
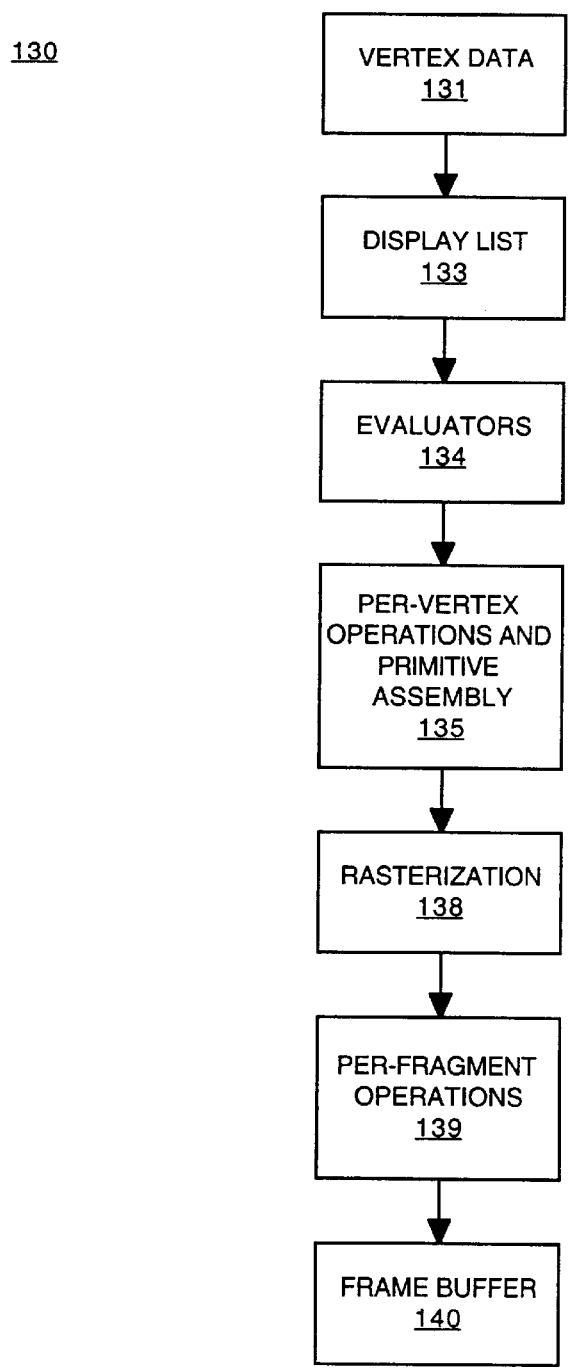
FIG. 1 is a block diagram showing the stages in one embodiment of a computer graphics pipeline executed by a computer graphics system.
Figure 2:
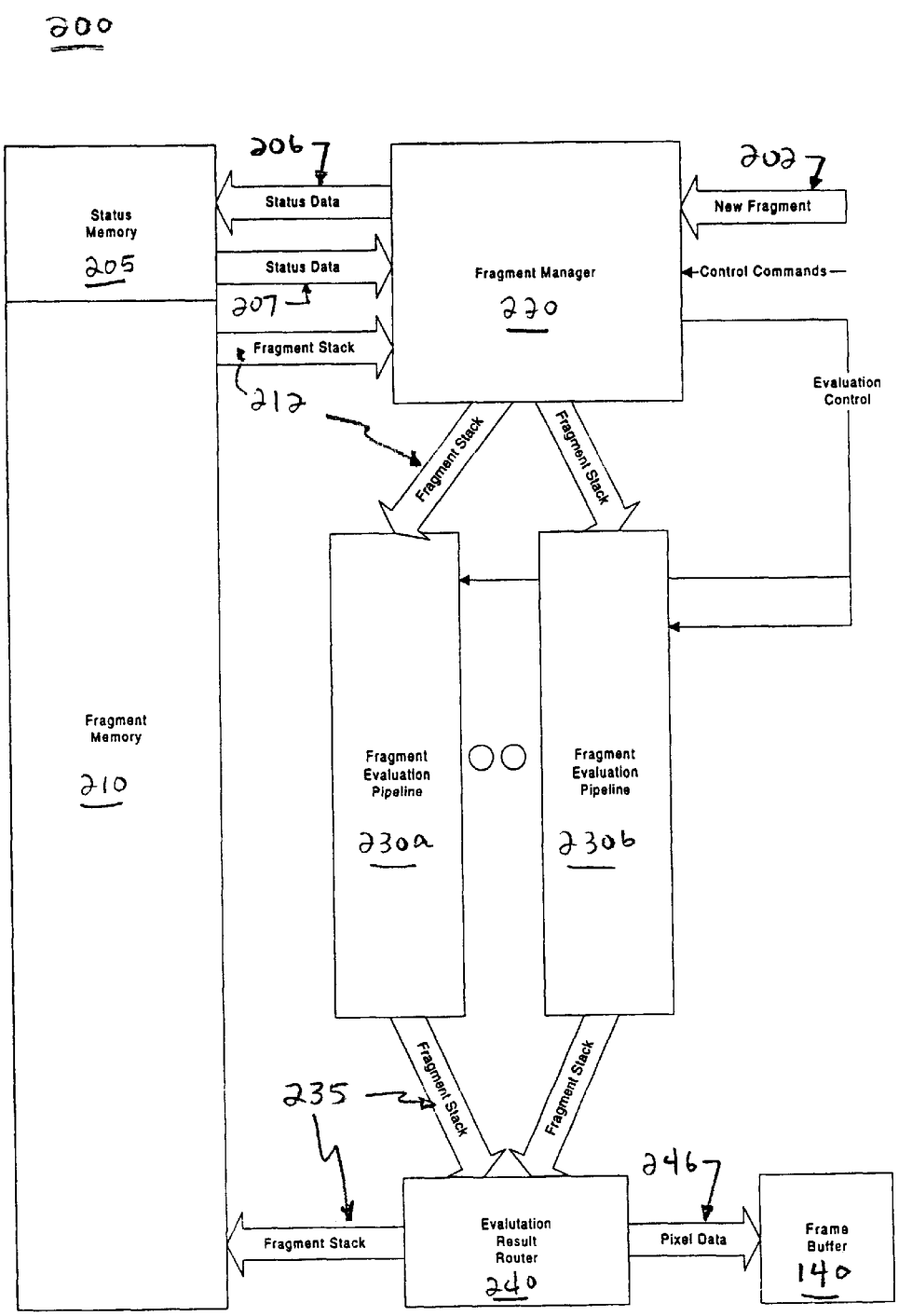
FIG. 2 is a data flow diagram showing one embodiment of an anti-aliasing buffer architecture used in a computer graphics system.
Figure 3:
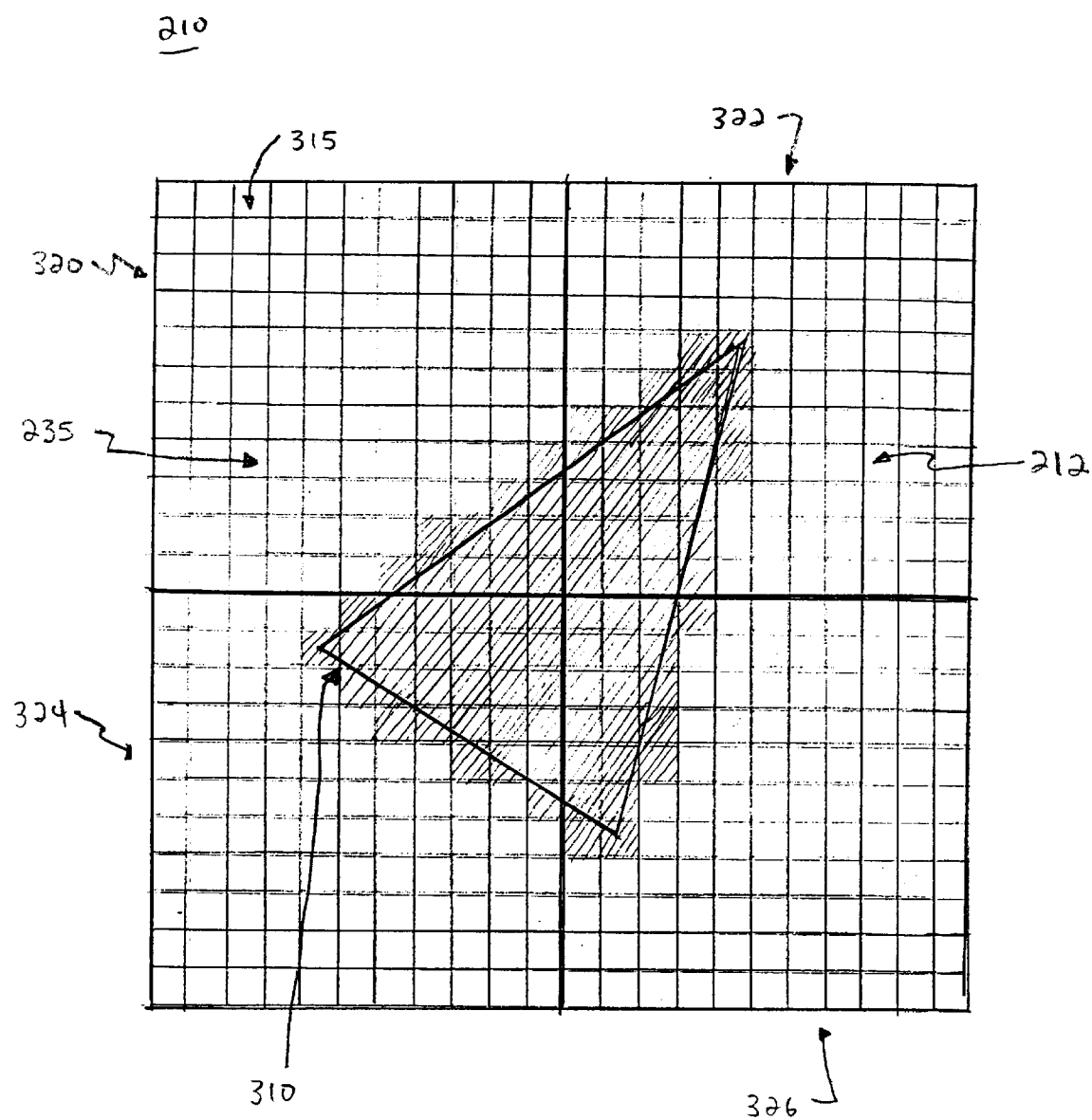
FIG. 3 illustrates a polygon spanning multiple memory pages in a fragment memory used with a computer graphics system.
Figure 4:
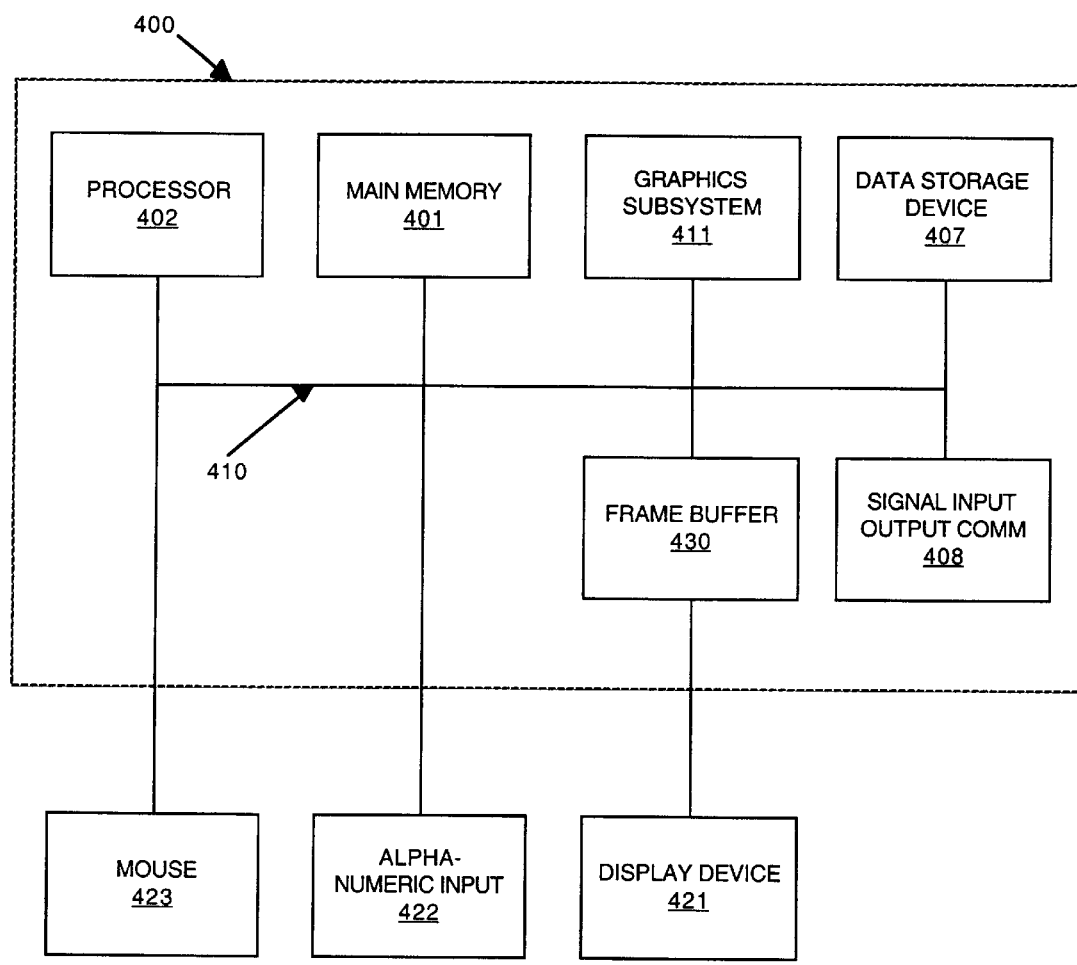
FIG. 4 is a block diagram of an exemplary computer system upon which embodiments of the present invention may be practiced.

FIG. 4 is a block diagram of graphics computer system 400 upon which embodiments of the present invention can be implemented. Computer system 400 executes a computer-controlled graphics program for generating complex or three-dimensional images.

Computer system 400 comprises a bus or other communication means 410 for communicating information, and a processor 402 coupled with bus 410 for processing information. Computer system 400 further comprises a random access memory (RAM) or other dynamic storage device 401 (main memory 401) coupled to bus 410 for storing information and instructions to be executed by processor 402. Main memory 401 also may be used for storing temporary variables or other intermediate information during execution of instructions by processor 402. Data storage device 407 is coupled to bus 410 and is used for storing information and instructions. Furthermore, signal input/output (I/O) communication device 408 is used to couple computer system 400 onto, for example, a network.

Computer system 400 can also be coupled via bus 410 to an alphanumeric input device 422, including alphanumeric and other keys, which is used for communicating information and command selections to processor 402. Another type of user input device is mouse 423 (or a like device such as a trackball or cursor direction keys) which is used for communicating direction information and command selections to processor 402 and for controlling cursor movement on display device 421. This input device typically has two degrees of freedom in two axes, a first axis (e.g., x) and a second axis (e.g., y), which allows the device to specify positions in a plane.

In accordance with the present invention, also coupled to bus 410 is graphics subsystem 411. Processor 402 provides graphics subsystem 411 with graphics data such as drawing commands, coordinate vertex data, and other data related to an object's geometric position, color, and surface parameters. In general, graphics subsystem 411 processes the graphical data, converts the graphical data into a screen coordinate system, generates pixel data (e.g., color, shading, texture) based on the primitives (e.g., points, lines, and polygons including triangles and quadrangles, as well as polygon meshes, strips and the like), and performs blending, anti-aliasing, and other functions. The resulting data are stored in frame buffer 430. A display subsystem (not shown) reads frame buffer 430 and displays the image on display device 421.

Figure 5:
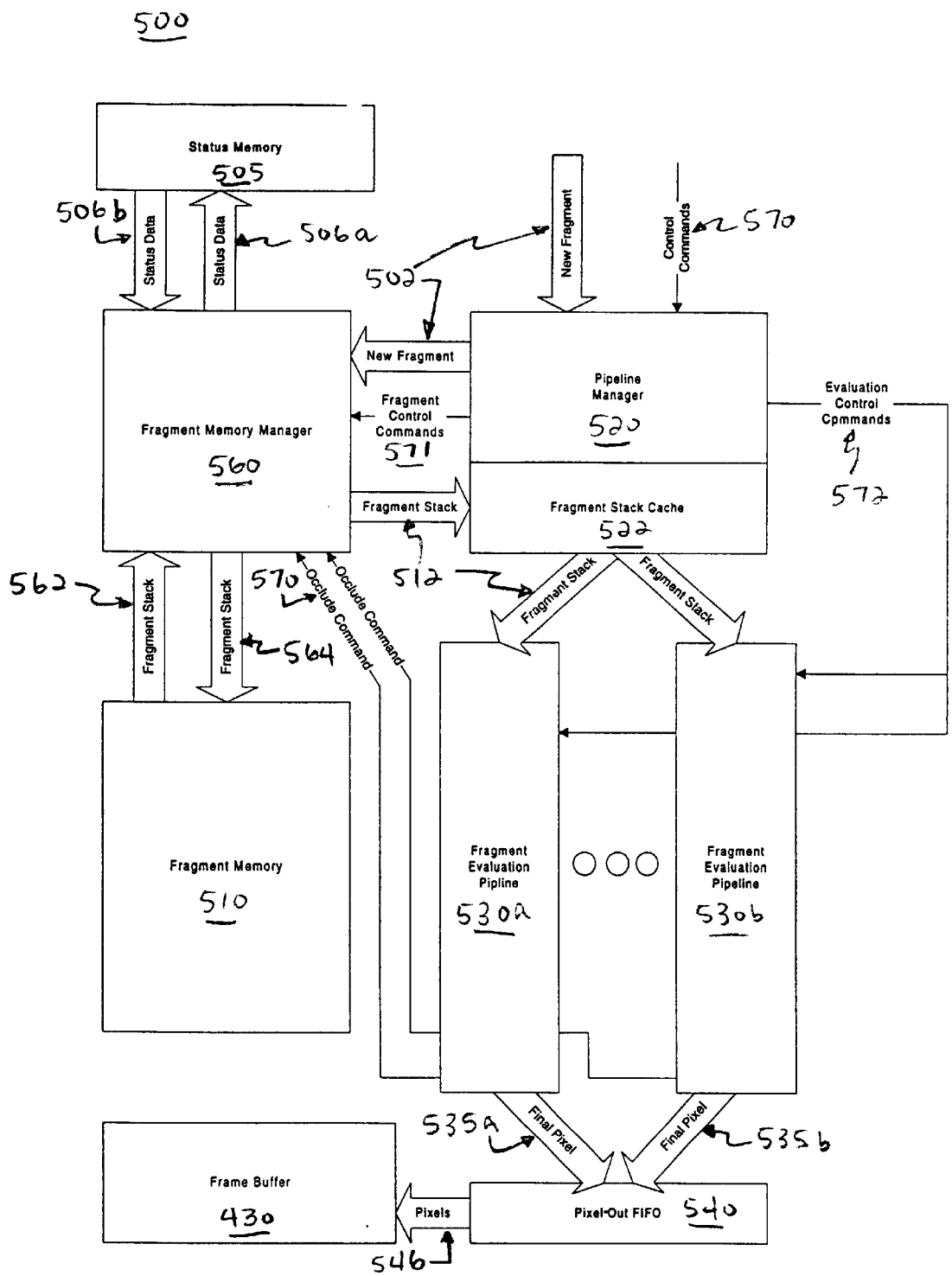
FIG. 5 is a data flow diagram showing one embodiment of an anti-aliasing buffer architecture used in a computer graphics system in accordance with the present invention.

FIG. 5 is a data flow diagram showing one embodiment of an anti-aliasing buffer (A-buffer) architecture 500 used in a computer graphics subsystem 411 (FIG. 4). In the present embodiment, A-buffer architecture 500 (specifically, fragment evaluation pipeline manager 520) responds to control commands 570 from processor 402 (FIG. 4). Pipeline manager 520 communicates with fragment memory manager 560 via fragment control commands 571, and with fragment evaluation pipelines 530a and 530b via evaluation control commands 572.

In the discussion below, A-buffer architecture 500 is discussed in the context of two parallel fragment evaluation pipelines supported by fragment memory 510. However, it is appreciated that more than two pipelines can be implemented in parallel, and that each pipeline may or may not have its own fragment memory.

With reference to FIG. 5, in accordance with the present invention, fragment stacks (e.g., fragment stack 562) are read from fragment memory 510 at fragment memory manager 560. Significantly, fragment stacks (e.g., fragment stack 564) are also written to fragment memory 510 at fragment memory manager 560, before fragment stack 564 is evaluated in a fragment evaluation pipeline (e.g., fragment evaluation pipeline 530a or 530b). Therefore, it is not necessary for the entire fragment stack to be passed all the way through a fragment evaluation pipeline before it is written back to fragment memory. As will be seen, this can improve processing performance in fragment evaluation pipelines 530a and 530b.

In accordance with the present embodiment of the present invention, status memory 505 is in a memory bank separate from fragment memory 510. Alternatively, status memory 505 can be placed on a separate bus. Sufficient memory bandwidth is available for access to the fragment stack data. By placing status memory 505 on a separate memory bus or in a separate memory bank, status memory 505 (specifically, a status memory page) can operate independently of a fragment memory page without affecting access to fragment data. In the present embodiment, status memory 505 is expanded to include an additional bit—the occlude status bit—per pixel location, in order to flag whether the fragment stack for a pixel location needs to be trimmed due to occlusion.

In the present embodiment, a new fragment 502 for a particular pixel location is received by fragment evaluation pipeline manager 520. Pipeline manager 520 sends new fragment 502 to fragment memory manager 560. Fragment memory manager 560 first checks status memory 505 to see if a fragment stack exists yet at that pixel location. If no fragment stack exists for a pixel location, only the new fragment is written to fragment memory 510 and then passed to fragment evaluation pipeline 530a or 530b. The status bits for that pixel location are updated to indicate that a fragment stack now exists.

If a fragment stack exists, fragment memory manager 560 reads fragment stack 562, corresponding to the particular pixel location, from fragment memory 510 (fragment stack memory). In the present embodiment, if the occlude status bit is not set, fragment memory manager 560 appends (adds) new fragment 502 to fragment stack 562, making fragment stack 564; that is, in this embodiment, fragment stack 564 comprises the fragments from fragment stack 562 and new fragment 502. Fragment stack 564 is then written back to fragment memory 510 and then to either fragment evaluation pipeline 530a or 530b via pipeline manager 520.

Thus, in accordance with the present invention, fragment stack 562 is read from a particular memory page in fragment memory 510, and fragment stack 564 (including new fragment 502) is written to fragment memory 510 soon enough thereafter that the same memory page is still open. As such, memory page thrashing will not occur. That is, for a fragment stack for a particular pixel location, there is no need for a memory swap to occur in order to perform a read transaction at one time, and then to perform a write transaction at a later time.

Thus, fragment evaluation pipelines 530a and 530b are not held up at the front end (or top) waiting for the fragment stacks that are to be processed. In addition, fragment evaluation pipelines 530a and 530b are not held up at the back end (or bottom) waiting for fragment stacks to be written to fragment memory. Consequently, processing performance and data throughput in graphics subsystem 411 (FIG. 4) are improved.

With reference still to FIG. 5, in the present embodiment, in those instances in which the fragment closest to the view plane in fragment stack 562 blocks the visibility of the rest of the stack, the fragment stack is considered occluded and fragment memory manager 560 will receive an occlude command 570 from one of the fragment evaluation pipelines 530a or 530b. Occlude command 570 identifies the pixel location of a fragment stack that should be "trimmed" (that is, occluded fragments can be deleted from the fragment stack identified by occlude command 570). In the present embodiment, in response to occlude command 570, fragment memory manager 560 sets the occlude status bit (e.g., status data 506a) in status memory 505. The status bits in status memory 505 correspond to the same pixel location that is associated with the fragment stack to be trimmed (e.g., fragment stack 562). An occlude status bit exists for each pixel location and thus for each fragment stack in fragment memory 510.

In the present embodiment, fragment stack 512 may be trimmed to two fragments if the occlude status bit (e.g., status data 506b) is set. In this case, fragment stack 512 will comprise the closest visible fragment from fragment stack 564 and the new fragment 502. These two fragments are stored in fragment memory 510 and passed to an evaluation pipeline 530a or 530b.

In one embodiment, when fragment stack 562 is read from fragment memory 510, fragment memory manager 560 will read the occlude status bit 506b for fragment stack 562. If the occlude status bit is set, only the top-most visible fragment and the new fragment are passed from fragment memory manager 560 to pipeline manager 520 in fragment stack 512. Only the top-most fragment and the new fragment 502 are written back to fragment memory 510. If the occlude status bit is not set, then stack trimming is not performed and all fragments, including the new fragment 502, are passed from fragment memory manager 560 to pipeline manager 520 in fragment stack 512. Once the occlude status bit 506b has been read, the status bit is turned off (that is, it is no longer set, until a subsequent occlude command is received for that pixel location).

It is appreciated that, in another embodiment, occluded fragments can be deleted from fragment stack 562 as it is read from fragment memory 510. In this case, fragment stack 512 would include the closest visible fragment from fragment stack 562 and new fragment 502. In one embodiment, occluded fragments are deleted from fragment stack 562 on the write to fragment memory 510.

Basically, there are three kinds of pixels in a rendered scene or image: background pixels, edge/transparent pixels, and interior pixels. Background pixels are at locations in the image where no polygons exist, and so the background color (or a background image) is used instead. There is no fragment stack for background pixels.

Edge/transparent pixels are pixels involved in showing an edge of at least one polygon, or are part of a visible, partially transparent polygon. The fragment stack for edge/transparent pixels is not involved with an occlude command 570, and the entire fragment stack is retained until fragment memory 510 is cleared for a new image. An additional trimming operation occurs if the number of fragments in the fragment stack exceeds the allowed number. In this case, the fragments are written back to fragment memory 510 in sorted order (according to the value of z, where z indicates the distance to the view plane). The color and z values for the last two fragments are averaged, and their fragment masks are ORed. The resultant fragment represents the last two fragments and replaces them in the stack.

Interior pixels are pixels that exist in the interior of a polygon. This type of pixel is generally the most numerous in a rendered image. In the present embodiment, occlude commands 570 are only applied to non-transparent interior pixels.

In the present embodiment, fragment memory manager 560 performs stack trimming by filtering fragments based on the current mode of z-dimension depth-sorting implemented in A-buffer architecture 500. Occlude command 570 is only applied to those cases where there are no edges or transparency in the topmost fragment. Evaluation pipeline 530a or 530b detects the case of an interior fragment occluding all fragments underneath it. This situation will result in the assertion of occlude command 570, which causes all the fragments except the fragment closest to the view plane to be removed from the fragment stack.

In the present embodiment, when fragment memory 560 sees the occlude status bit 506b is set for a fragment stack, the fragment stack is written to fragment memory 510 as follows: the first fragment is written to fragment memory 510, and the next fragment is checked to see if its z-dimension is less than the previous one. If the z-dimension is less, then the latter fragment replaces the preceding one in fragment memory 510. This process continues until all of the fragments in the fragment stack have been compared. The new incoming fragment is written to fragment memory 510 as well. The new stack size is two fragments.

For example, if the topmost fragment (the fragment with a smaller value for the z-dimension) completely covers a pixel location and is not transparent, then lower fragments (having higher values of z) will not be visible and thus can be deleted from the fragment stack. Another case is one in which two or more fragments with equal z values form a seam between adjoining polygons. In this case, if these fragments completely cover the area at the pixel location where they meet, then fragments behind them will be occluded and can be deleted. In one implementation, fragments with equal values for the z-dimension may be merged into a single fragment depending on a register setting selected by the system designer.

Consequently, if the occlude status bit 506b is set, fragment stack 512 will comprise fewer fragments than either fragment stack 562 or fragment stack 564. Deleting occluded fragments from a fragment stack means that the fragment stack can be more quickly read from and written to fragment memory 510, and more quickly processed in fragment evaluation pipeline 530a. Thus, stack trimming will increase data throughput in A-buffer architecture 500. In addition, a fragment stack that has been trimmed saves space in fragment memory 510.

In the present embodiment, fragment stack 512 is sent from fragment memory manager 560 to pipeline manager 520. Fragment stack 512 is then fed into one of the fragment evaluation pipelines (e.g., 530a) by pipeline manager 520. In one embodiment, fragment stack 512 is buffered in a fragment stack cache 522 before entering fragment evaluation pipeline 530a.

Continuing with reference to FIG. 5, fragment stack 512 is forwarded to one of the fragment evaluation pipelines 530a or 530b. In the present embodiment, fragment evaluation pipelines 530a and 530b perform z-ordered depth sorting of the fragments in fragment stack 512. Thus, in accordance with the present invention, fragments can be stored in fragment memory 510 in random (arbitrary) z-dimension order within a fragment stack (that is, for example, fragments in fragment stack 564 do not need to be sorted according to the z-dimension before the fragment stack is stored in fragment memory 510). As described above, fragment memory manager 560 can filter fragments based on the current mode of z-ordered depth-sorting implemented in A-buffer architecture 500. Thus, the operations associated with depth-sorting the fragments in a fragment stack are relegated to a series of pipeline stages, and do not affect overall throughput.

Fragment evaluation pipelines 530a and 530b function to determine the final pixel color for each pixel location. After evaluation in the pipeline, the final pixel color (e.g., final pixel 535a) for each pixel location is buffered in pixel-out FIFO (first-in, first-out) 540. Pixels 546 from pixel-out FIFO 540 are stored in frame buffer 430. A display subsystem (not shown) reads the data from frame buffer 430 and renders an image that is displayed on display device 421 (FIG. 4).

In accordance with the present invention, a fragment stack is not written back to fragment memory 510 after it has been processed in fragment evaluation pipeline 530a or 530b. Accordingly, pixel writes to frame buffer 430 are not held up because of page misses in fragment memory 510.

It is appreciated that, in accordance with the present invention, more than two fragment evaluation pipelines can be used in A-buffer architecture 500. Because memory thrashing is not an issue, the processing workload and data throughput can be increased by adding parallel fragment evaluation pipelines to expand A-buffer architecture 500. Resultant pixel colors from each pipeline are interleaved as described in conjunction with FIG. 6.

Figure 6:
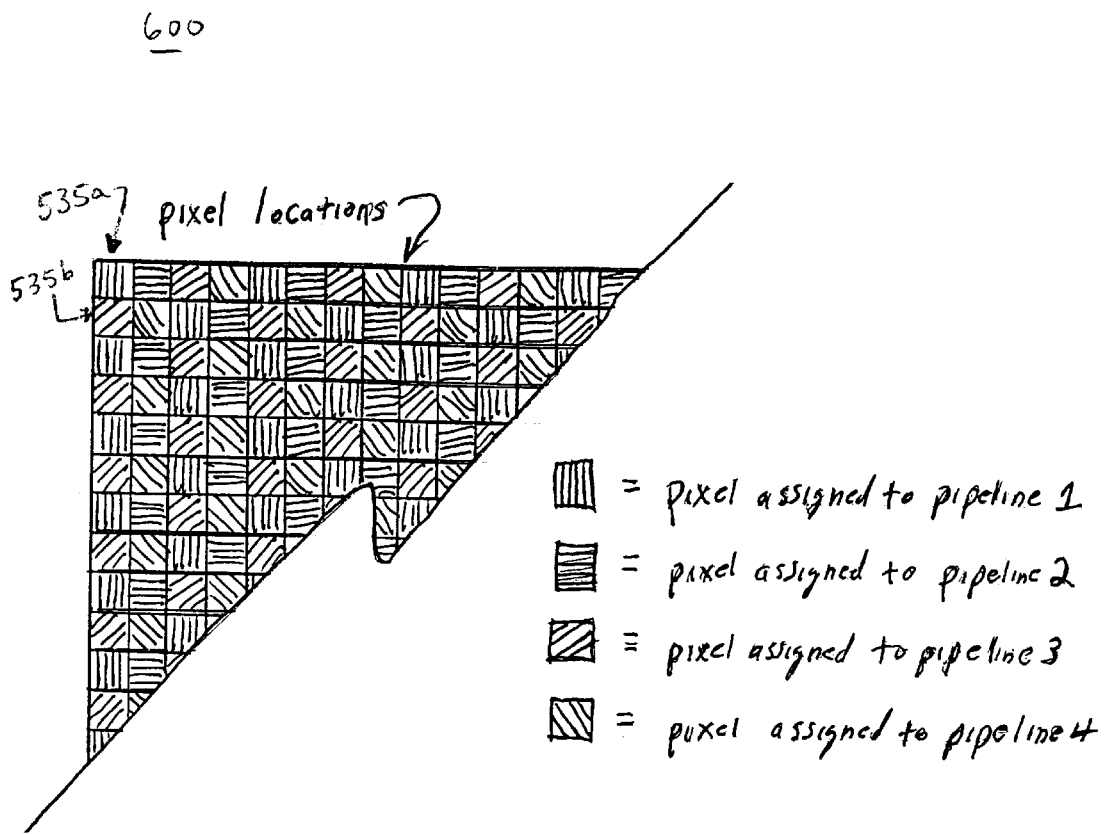
FIG. 6 illustrates the interleaving of pixels/fragment stacks in a computer graphics system in accordance with one embodiment of the present invention.

FIG. 6 illustrates the interleaving of pixels/fragment stacks in a computer graphics subsystem 411 (FIG. 4) in accordance with one embodiment of the present invention. In this embodiment, four fragment evaluation pipelines (exemplified by fragment evaluation pipelines 530a and 530b of FIG. 5) are executed in parallel. The pixels/fragments (exemplified by 535a and 535b) are interleaved in frame buffer 430 (FIG. 4) in a pattern 600; however, it is appreciated that there are many other possible patterns.

Figure 7:
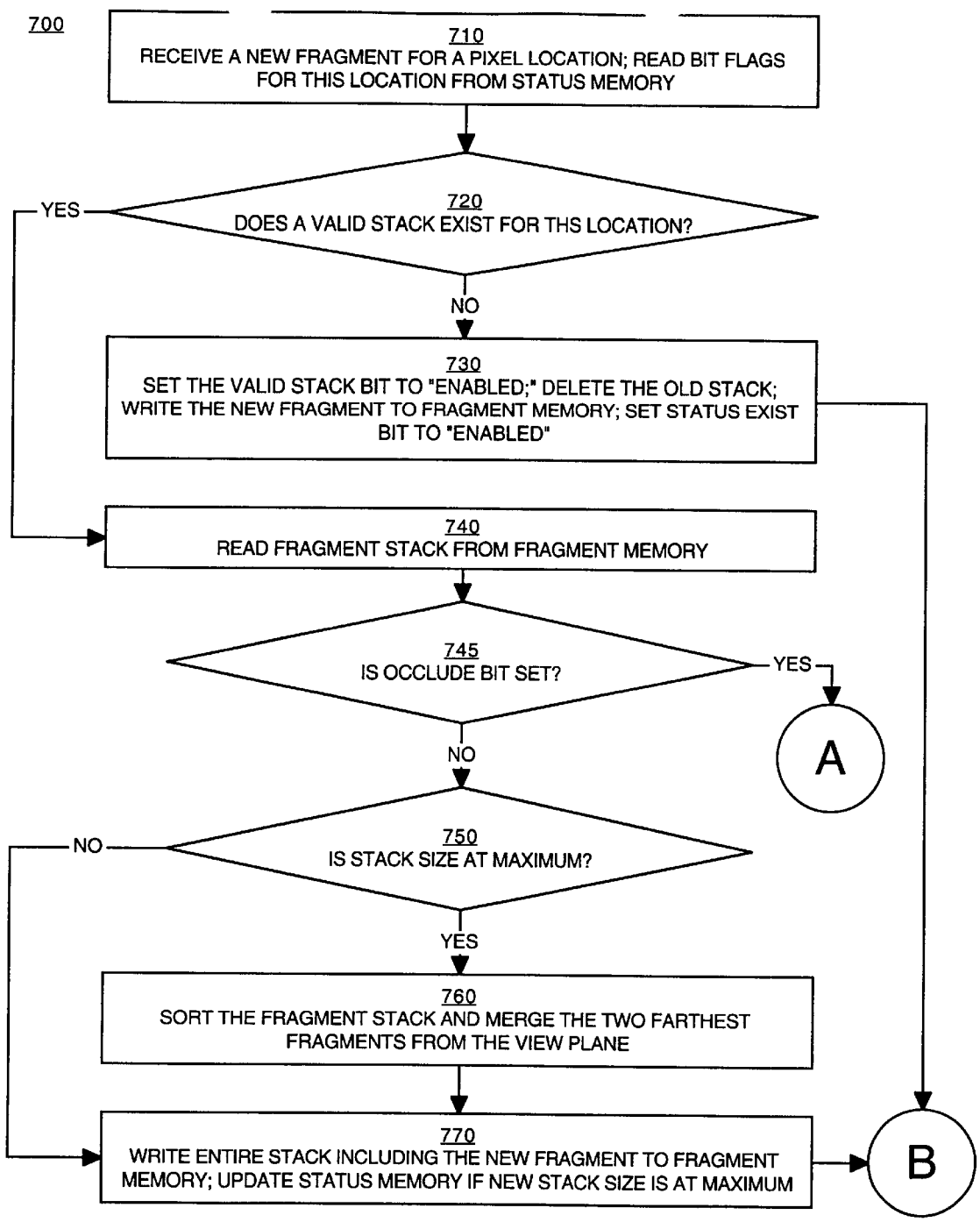
FIG. 7 is a flowchart of the steps in a process for processing fragments/fragment stacks in a computer graphics system in accordance with one embodiment of the present invention.
Figure 7:
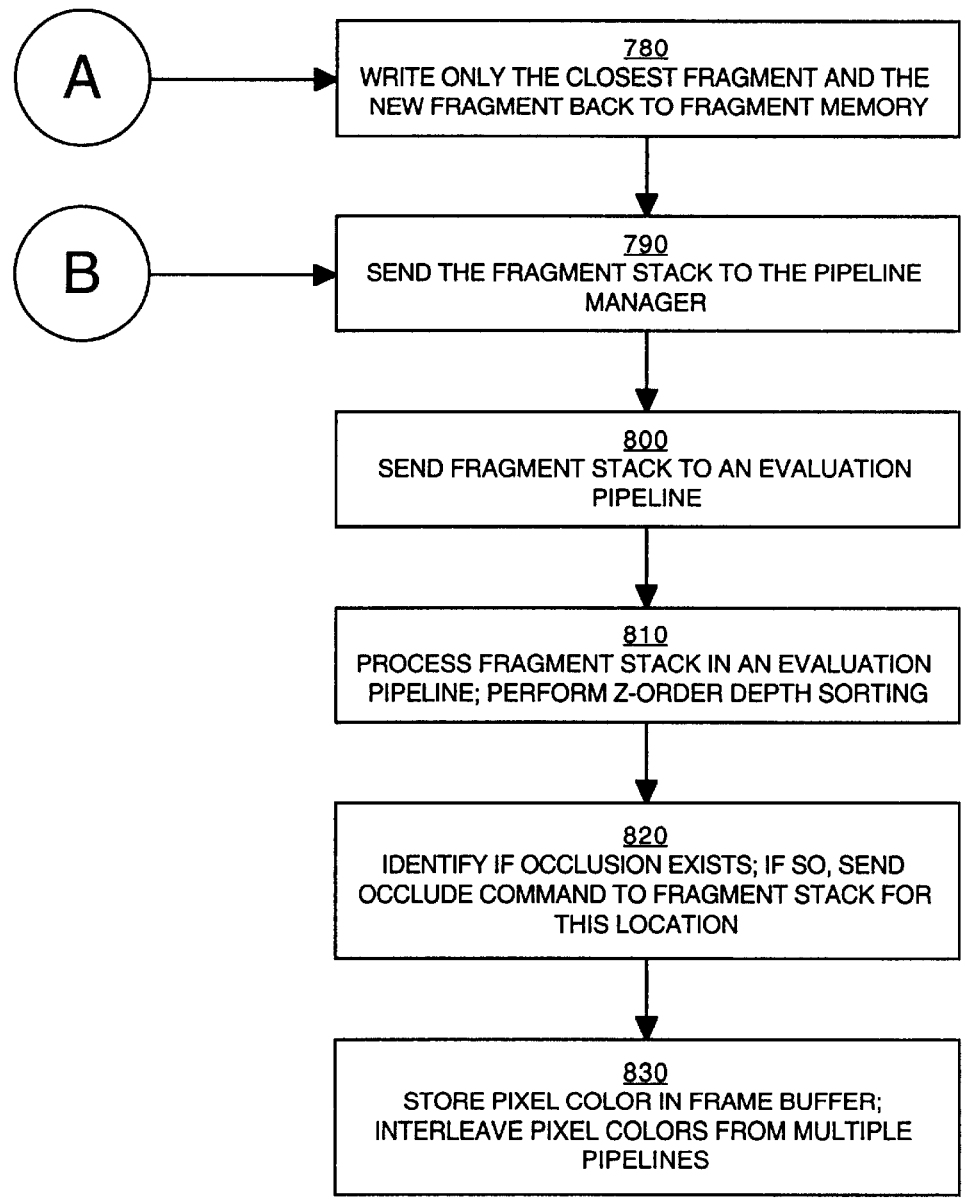

FIG. 7 is a flowchart of the steps in a process 700 for processing fragments/fragment stacks in a computer graphics system 411 (FIG. 4) in accordance with one embodiment of the present invention. In the present embodiment, process 700 is implemented using A-buffer architecture 500 of FIG. 5.

With reference to FIG. 7 and also to FIG. 5, in step 710, a new fragment 502 for a particular pixel location is received. In the present embodiment, new fragment 502 is received by fragment evaluation pipeline manager 520. In this embodiment, new fragment 502 is forwarded by pipeline manager 520 to fragment memory manager 560. The status bit flags for the pixel location are read from status memory 505 to determine if a fragment stack exists yet at that pixel location.

In step 720 of FIG. 7, and with reference also to FIG. 5, the "exist" and "valid/invalid" bits in status memory 505 are checked for the particular pixel location to determine if a fragment stack already exists at that location, and if the fragment stack is valid. If a valid fragment stack exists at the pixel location, then process 700 proceeds to step 740; otherwise, process 700 proceeds to step 730.

In step 730, with reference also to FIG. 5, a status bit (the valid/invalid stack bit) is set to "enabled." If a fragment stack exists at the particular pixel location but it is invalid, the existing stack is deleted from fragment memory 510. New fragment 502 is written to fragment memory 510 at that location and the status exist bit is set to "enabled."

In step 740 of FIG. 7, with reference also to FIG. 5, the valid fragment stack (e.g., fragment stack 562) is read from fragment memory 510.

In step 745, with reference as well to FIG. 5, fragment memory manager 560 checks the occlude status bit 506b for the current pixel location in status memory 505. If the occlude status bit 506b is set, then process 700 proceeds to step 780; otherwise, process 700 proceeds to step 750.

In step 750 of FIG. 7, again with reference to FIG. 5, the "size" bit in status memory 505 is checked to determine whether the size of the fragment stack 562 is larger than the allowed maximum size (e.g., the number of fragments in the stack is greater than the maximum number allowed). If not, process 700 proceeds to step 770; if so, process 700 proceeds to step 760.

In step 760, with reference also to FIG. 5, if the number of fragments in the fragment stack 562 exceeds the maximum number, then the two fragments furthest from the view plane are merged.

In step 770, with reference also to FIG. 5, new fragment 502 is added to fragment stack 562, and fragment stack 564 including new fragment 502 is written to fragment memory 510. If the number of fragments in fragment stack 564 is at the maximum allowable value (from step 760), then status memory 505 is updated to reflect this.

In step 780 of FIG. 7, and with reference to FIG. 5, if the occlude status bit 506b is set, only the top-most fragment (e.g., closest to the view plane) from fragment stack 564 (comprising fragment stack 562 and new fragment 502) is written back to fragment memory 510.

In accordance with the present invention, fragment stack 564 is written back to fragment memory 510 (FIG. 5) before it is processed in fragment evaluation pipeline 530a or 530b. Advantageously, fragment stack 564 is written to fragment memory 510 soon enough after fragment stack 562 was read that a memory swap is not needed to complete both the read and write transactions for the particular pixel location. As such, memory thrashing will not occur, and so processing performance and data throughput are improved.

In addition, because fragment stack 564 is written to fragment memory 510 before processing to determine a pixel color is performed, it is not necessary to store in fragment memory 510 the header information pertaining to the final pixel color for each pixel location. Consequently, fragment stack 564 requires less space in memory, and subsequent reads of fragment stack 564 can be performed more quickly.

In the present embodiment, depth sorting is performed by fragment evaluation pipelines 530a and 530b (see step 810, below), and therefore fragments in a fragment stack can be stored in random (arbitrary) z-dimension order in fragment memory 510. Thus, it is not necessary to perform operations to put fragment stack 564, for example, into a sorted order based on the value of z. Because z-ordered depth sorting is done as a series of evaluation pipeline stages, it does not affect system throughput.

In step 790 of FIG. 7, again with reference as well to FIG. 5, fragment stack 512 is sent to pipeline manager 520.

In step 800 of FIG. 7, with reference also to FIG. 5, fragment stack 512 is sent to fragment evaluation pipeline 530a or 530b. In one embodiment, fragment stack 512 can be buffered in fragment stack cache 522 before proceeding to fragment evaluation pipeline 530a or 530b.

In step 810 of FIG. 7, and with reference to FIG. 5, fragment stack 512 is evaluated in fragment evaluation pipeline 530a or 530b. In the present embodiment, fragment evaluation pipelines 530a and 530b perform z-ordered depth sorting on the fragments in fragment stack 512. Fragment evaluation pipelines 530a and 530 function to determine a final pixel color for each pixel location (and fragment stack) being evaluated.

In step 820 of FIG. 7, with reference also to FIG. 5, in the present embodiment, fragment evaluation pipeline 530a or 530b identifies whether there are any occluded fragments in fragment stack 512. If so, fragment evaluation pipeline 530a or 530b sends an occlude command 570 to fragment memory manager 560. In response to the occlude command 570, fragment memory manager 560 sets an occlude status bit 506a in status memory 505. Occlude status bit 506a corresponds to the same pixel location as fragment stack 512.

In step 830 of FIG. 7, with reference to FIG. 5 also, pixels 546 are stored in frame buffer 430. In the present embodiment, final pixels 535a and 535b are sent from fragment evaluation pipelines 530a and 530b, respectively, to pixel-out FIFO 540. Final pixels 535a and 535b are interleaved as described in conjunction with FIG. 6 and stored in frame buffer 430. In accordance with the present invention, a fragment stack is not written back to fragment memory 510 after it has been processed in fragment evaluation pipeline 530a or 530b. Accordingly, pixel writes to frame buffer 430 are not held up because of page misses in fragment memory 510, improving processing performance and data throughput in computer graphics subsystem 411 (FIG. 4).

In summary, the present invention provides a method and system that can resolves the memory thrashing problem that occurs when reading and writing fragment stacks from fragment memory. The present invention also provides a method and system that can increase the speed at which fragment stacks are read from and written to fragment memory. In addition, the present invention provides a method and system that can increase the data throughput in a computer graphics system. The present invention also provides a method and system that can allow status memory to operate independently of fragment memory.

The preferred embodiment of the present invention, a method and design for improved fragment processing, is thus described. While the present invention has been described in particular embodiments, it should be appreciated that the present invention should not be construed as limited by such embodiments, but rather construed according to the below claims.

What is claimed is:

1. A method for processing data in a computer graphics system, said method comprising the steps of:
   a) receiving a fragment for a pixel location;
   b) reading from fragment memory a first fragment stack, wherein said first fragment stack corresponds to said pixel location;
   c) appending said fragment to said first fragment stack to make a second fragment stack; and
   d) writing said second fragment stack to said fragment memory prior to sending said second fragment stack to a computer graphics pipeline.

2. The method as recited in claim 1 wherein said step b) comprises the step of:
   b1) deleting an occluded fragment from said first fragment stack.

3. The method as recited in claim 1 wherein fragments in a fragment stack are stored in arbitrary z-dimension order, wherein said z-dimension indicates distance to a view plane.

4. The method as recited in claim 1 further comprising the steps of:
   e) sending said second fragment stack to said computer graphics pipeline;
   f) processing said second fragment stack in said computer graphics pipeline, wherein said processing determines a pixel color for said pixel location; and
   g) storing said pixel color in a frame buffer memory.

5. The method as recited in claim 4 wherein said step e) comprises the step of:
   e1) deleting an occluded fragment from said second fragment stack.

6. The method as recited in claim 4 wherein said step f) comprises the step of:
   f1) performing z-ordered depth sorting of fragments in said second fragment stack.

7. The method as recited in claim 4 wherein said step g) comprises the step of:
   g1) interleaving pixel colors determined from a plurality of computer graphics pipelines executing in parallel.

8. The method as recited in claim 4 further comprising the steps of:
   h1) identifying a fragment stack comprising an occluded fragment;
   h2) setting an occlude status bit for said fragment stack;
   h3) sending only a visible fragment closest to a view plane and said fragment from said fragment stack to said computer graphics pipeline when said occlude status bit is set; and
   h4) writing said visible fragment closest to said view plane and said fragment back to said fragment memory.

9. The method as recited in claim 8 wherein said status bit is set in status memory, wherein said status memory is separate from said fragment memory.

10. A computer system comprising:
   a bus;
   a fragment memory coupled to said bus;
   a frame buffer coupled to said bus; and
   a processor coupled to said bus, said processor for performing a method for processing data in a computer graphics subsystem, said method comprising the steps of:
      a) receiving a fragment for a pixel location;
      b) reading from said fragment memory a first fragment stack, wherein said first fragment stack corresponds to said pixel location;
      c) appending said fragment to said first fragment stack to make a second fragment stack; and d) writing said second fragment stack to said fragment memory prior to sending said second fragment stack to a computer graphics pipeline.

11. The computer system of claim 10 wherein said step b) of said method further comprises the steps of:

b1) deleting an occluded fragment from said first fragment stack.

12. The computer system of claim 10 wherein fragments in a fragment stack are stored in arbitrary z-dimension order, wherein said z-dimension indicates distance to a view plane.

13. The computer system of claim 10 wherein said method further comprises the step of:

e) sending said second fragment stack to said computer graphics pipeline;

f) processing said second fragment stack in said computer graphics pipeline, wherein said processing determines a pixel color for said pixel location; and g) storing said pixel color in said frame buffer memory.

14. The computer system of claim 13 wherein said step e) of said method comprises the step of:

e1) deleting an occluded fragment from said second fragment stack.

15. The computer system of claim 13 wherein said step f) of said method comprises the step of:

f1) performing z-ordered depth sorting of fragments in said second fragment stack.

16. The computer system of claim 13 wherein said step g) of said method comprises the step of:

g1) interleaving pixel colors determined from a plurality of computer graphics pipelines executing in parallel.

17. The computer system of claim 13 wherein said method further comprises the steps of:

h1) identifying a fragment stack comprising an occluded fragment;

h2) setting an occlude status bit for said fragment stack;

h3) sending only a visible fragment closest to a view plane and said fragment from said fragment stack to said computer graphics pipeline when said occlude status bit is set; and h4) writing said visible fragment closest to said view plane and said fragment back to said fragment memory.

18. The computer system of claim 17 wherein said status bit is set in a status memory separate from said fragment memory.

19. An anti-aliasing buffer architecture in a computer graphics system, said anti-aliasing buffer architecture comprising:

a fragment memory operable to store a plurality of fragment stacks, wherein a fragment stack is associated with a pixel location;

a fragment evaluation pipeline coupled to said fragment memory, said fragment evaluation pipeline operable to process fragment stacks and determine pixel colors for pixel locations;

a frame buffer operable to store said pixel colors determined by said fragment evaluation pipeline; and circuitry for supplying said fragment stack including a new fragment to said fragment memory prior to processing said fragment stack by said fragment evaluation pipeline.

20. The anti-aliasing buffer architecture of claim 19 wherein fragments in said fragment stack are stored in arbitrary z-dimension order, wherein said z-dimension indicates distance to a view plane.

21. The anti-aliasing buffer architecture of claim 20 wherein said fragment evaluation pipeline is operable to perform z-ordered depth sorting of said fragment stack.

22. The anti-aliasing buffer architecture of claim 19 comprising:

a fragment memory manager coupled to said fragment memory, said fragment memory manager operable to delete an occluded fragment from said fragment stack in response to an occlude command.

23. The anti-aliasing buffer architecture of claim 22 wherein an occlude status bit for said fragment stack is set in response to said occlude command, wherein only a visible fragment closest to a view plane and said new fragment are sent from said fragment stack to said computer graphics pipeline when said occlude status bit is set.

24. The anti-aliasing buffer architecture of claim 23 further comprising:

a status memory coupled to said fragment memory manager, said status memory operable to store an occlude status bit for each pixel location.

25. The anti-aliasing buffer architecture of claim 22 wherein said fragment memory manager is further operable to append said new fragment to said fragment stack and to write said fragment stack including said new fragment to said fragment memory.

26. The anti-aliasing buffer architecture of claim 25 further comprising:

a fragment evaluation pipeline manager coupled to said fragment memory manager and to said fragment evaluation pipeline, said fragment evaluation pipeline manager operable to receive said fragment stack including said new fragment from said fragment memory manager and to send said fragment stack including said new fragment to said fragment evaluation pipeline.

27. The anti-aliasing buffer architecture of claim 19 further comprising:

a plurality of fragment evaluation pipelines executing in parallel, wherein pixel colors determined from said fragment evaluation pipelines are interleaved and stored in said frame buffer.

* * * * *